United States Patent
Yamaguchi et al.

(10) Patent No.: US 7,145,593 B2
(45) Date of Patent: Dec. 5, 2006

(54) FOLDABLE MOBILE TERMINAL DEVICE

(75) Inventors: Seiya Yamaguchi, Machida (JP); Noriyoshi Satoh, Yokohama (JP); Muneoki Kamata, Yokohama (JP); Yasuyuki Tanaka, Yokohama (JP)

(73) Assignees: Panasonic Mobile Communications Co., Ltd, Kanagawa (JP); NTT DoCoMo, Inc., Tokyo (JP)

( * ) Notice: Subject to any disclaimer, the term of this patent is extended or adjusted under 35 U.S.C. 154(b) by 129 days.

(21) Appl. No.: 10/684,631

(22) Filed: Oct. 14, 2003

(65) Prior Publication Data

US 2004/0130658 A1    Jul. 8, 2004

(30) Foreign Application Priority Data

Oct. 15, 2002    (JP)    ............ P. 2002-300646

(51) Int. Cl.
 *H04N 7/14*    (2006.01)
(52) U.S. Cl. ............ 348/14.02; 348/333.06; 396/348
(58) Field of Classification Search .. 348/14.01–14.16, 348/373, 333.06, 376, 14.02, 14.11; 396/287, 396/348; 455/575.3
See application file for complete search history.

(56) References Cited

U.S. PATENT DOCUMENTS

| | | | |
|---|---|---|---|
| 2001/0004269 A1 | 6/2001 | Shibata et al. | |
| 2001/0005454 A1* | 6/2001 | Nishino et al. | ............ 396/287 |

FOREIGN PATENT DOCUMENTS

| | | |
|---|---|---|
| EP | 1 357 726 A1 | 10/2003 |
| GB | 2 384 384 A | 7/2003 |
| JP | 11-112860 | 4/1999 |
| JP | 2001-169166 | 6/2001 |
| JP | 2003-152848 | 5/2003 |
| JP | 2003-258995 | 9/2003 |
| WO | WO 01/84269 | 11/2001 |

* cited by examiner

*Primary Examiner*—Stella Woo
(74) *Attorney, Agent, or Firm*—Pearne & Gordon LLP

(57) ABSTRACT

The present provides a mobile terminal device includes first and second housings foldably coupled to each other by a hinge portion, and the first housing can turn in the direction orthogonal to the unfolding/folding direction. The mobile terminal device also includes a first camera provided for a surface opposed to said second housing in a state that the device is folded, and a second camera provided for a surface of the first or second housing on the opposite side to the surface having the first camera, when the two housings are unfolded at an angle of about 90° and the first housing turns at an angle of about 90° to the second housing, and a sensor for detecting a positional relation between the two housings according to a change of the angle between the two housings. According to the detected position, operations of the first and second camera are stopped/started.

4 Claims, 5 Drawing Sheets

FOLDABLE MOBILE TERMINAL DEVICE

BACKGROUND OF THE INVENTION

1. Field of the Invention

The present invention relates to a mobile terminal device in which first and second housings are foldably coupled to each other through a hinge portion, and particularly to a mobile terminal device having plural image pick-up sections.

2. Description of the Related Art

A mobile terminal device has been proposed, in which an upper housing and a lower housing are coupled by a hinge portion foldably and further the upper housing can turn in relation to the lower housing in a direction orthogonal to the above unfolding/folding direction.

In this mobile terminal device, a camera and a display are mounted on one surface of the upper housing, and a camera is mounted also at one end of the hinge portion. Further, the display is used in order to display a picture from the operating camera.

The thus constructed mobile terminal device can be used as a video camera with a monitor, in a state where the upper housing and the lower housing unfold at an angle of about 90° and further the upper housing is turned at an angle of 90° to the lower housing.

Further, the above mobile terminal device can control starting of each of functions thereof according to the unfolding/folding position between the upper and lower housings, or the rotary position between the upper and lower housings. For example, as described above, in case that the upper housing and the lower housing are unfolded at an angle of 90°, and further the upper housing is turned at an angle of 90°, a video camera mode starts automatically (refer to, for example, Patent Literature 1).

[Patent Literature 1]

JP-A-2001-169166

In the above conventional mobile terminal device, it is possible to start each function according to the positional relation between the upper housing and the lower housing. However, after the video camera mode was started, the operation for setting which of two cameras is used for shooting images must be performed by a user himself. Namely, though the digital camera mode can be started automatically by a simple operation, the operation control of the camera itself can be not performed automatically.

SUMMARY OF THE INVENTION

In view of the above circumstances, an object of the invention is to provide a mobile terminal device provided with plural image pick-up sections, wherein an operation of each image pick-up section can be controlled by a simple operation.

A mobile terminal device of the present invention includes first and second housings formed nearly in the shape of a rectangular parallelepiped and foldably coupled to each other by a hinge portion. And, in relation to the second housing, the first housing can turn in the direction orthogonal to the unfolding/folding direction. The mobile terminal device further comprises a first image pick-up section and a second image pick up section. The first image pick-up section is provided for a surface orthogonal to the unfolding/folding direction of the first housing. The second image pick-up section is provided for a surface on the opposite side to the surface having the first image pick-up section, in a state where the first and second housings open so that they form an angle of about 90° and the other housing turns at an angle of about 90° to the one housing. The mobile terminal device further comprises a position detecting section for detecting a positional relation between the first and second housings by a change of the angle between the first and second housings. Further, herein, when the position detecting section detects, in a state where the first and second housings are unfolded and the first image pick-up section is operating, that the first and second housings are changing in a direction where they are folded, the operation of the first image pick-up section is stopped.

By this constitution, when the first and second housings are folded in the state where the first image pick-up section is operating, the operation of the first image pick-up section is stopped. Accordingly, it is not necessary to perform the stopping operation of the first image pick-up section by a key operation. Therefore, the operation of the first image pick-up section can be controlled by a simple operation.

Further, in the mobile terminal device of the present invention, when the position detecting section detects that the first and second housings are changing in a direction where they are unfolded or in a direction where they are folded, in a state where the first and second housings are unfolded at an angle of about 90°, the other housing is turned at an angle of about 90° to the one housing, and the second image pick-up section is operating, the operation of the second image pick-up section is stopped.

By this constitution, when unfolding and folding of the first and second housings are performed in the state where the second image pick-up section is operating, the operation of the second image pick-up section is stopped. Accordingly, it is not necessary to perform the stopping operation of the second image pick-up section by a key operation. Therefore, the operation of the second image pick-up section can be controlled by a simple operation.

Further, in the mobile terminal device of the invention, when the position detecting section detects, in a state where the first and second housings are unfolded and the first image pick-up section is operating, that the angle formed by the first and second housings changes to about 90°, the operation of the first image pick-up section is stopped, and the operation of the second image pick-up section is started.

Under this constitution, when the first and second housings are folded so that the angle formed by them becomes about 90° in the state where the first image pick-up section is operating, the operation of the first image pick-up section is stopped and the operation of the second image pick-up section is started. Accordingly, it is not necessary to switch the operations of the image pick-up sections by a key operation. Therefore, switching of the operations of the image pick-up sections which are different from each other in camera direction can be quickly performed by a simple operation.

Further, when the position detecting section detects, in a state where the first and second housings are unfolded at an angle of about 90°, further the other housing is turned at an angle of about 90° to the one housing, and the second image pick-up section is operating, that the first and second housings are changing in a direction where they are unfolded, the operation of the second image pick-up section is stopped and the operation of the first image pick-up section is started.

By this constitution, when the operation of unfolding the first and second housings is performed in the state where the second image pick-up section is operating, the operation of the second image pick-up section is stopped and the operation of the first image pick-up section is started. Accordingly, it is not necessary to switch the operations of the image pick-up sections by a key operation. Therefore, switching of the operations of the image pick-up sections which are different from each other in camera direction can be quickly performed by a simple operation.

Figure 1:
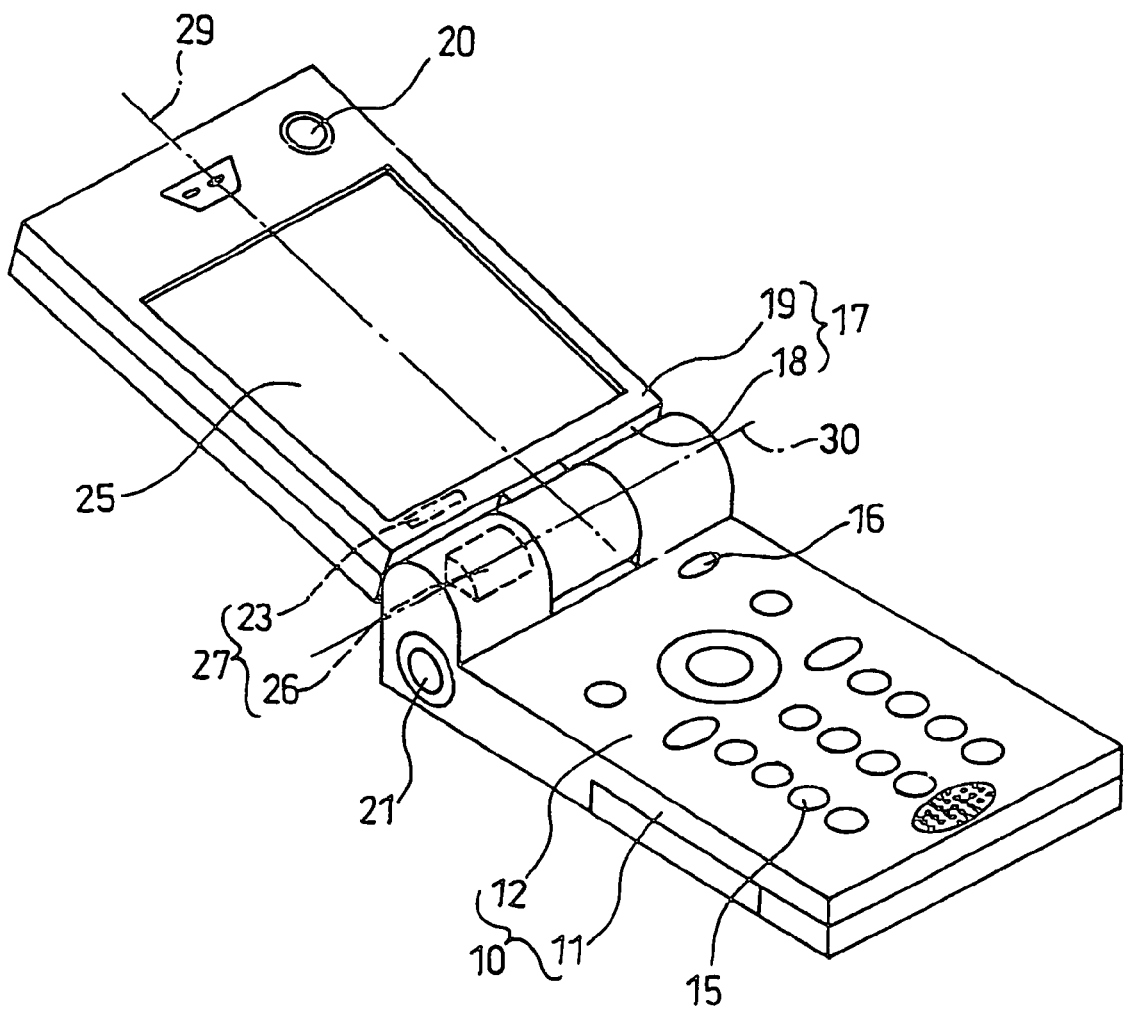
FIG. 1 is a perspective view showing the exterior constitution of a mobile terminal device according to an embodiment of the invention.

In the drawings, the reference numeral 10 refers to a second housing; 13 to a zoom button; 14 to a camera button; 16 to a microphone; 17 to a first housing; each of 20, 21, and 22 to a camera; 23 to a sensor; 24 to a hinge portion; 25 to a display monitor; 26 to a magnet; 27 to a sensor portion; 29 to a second rotary axis; and 30 to a first rotary axis.

DETAILED DESCRIPTION OF THE PREFERRED EMBODIMENTS

An embodiment of the invention will be described below with reference to drawings.

Figure 2:
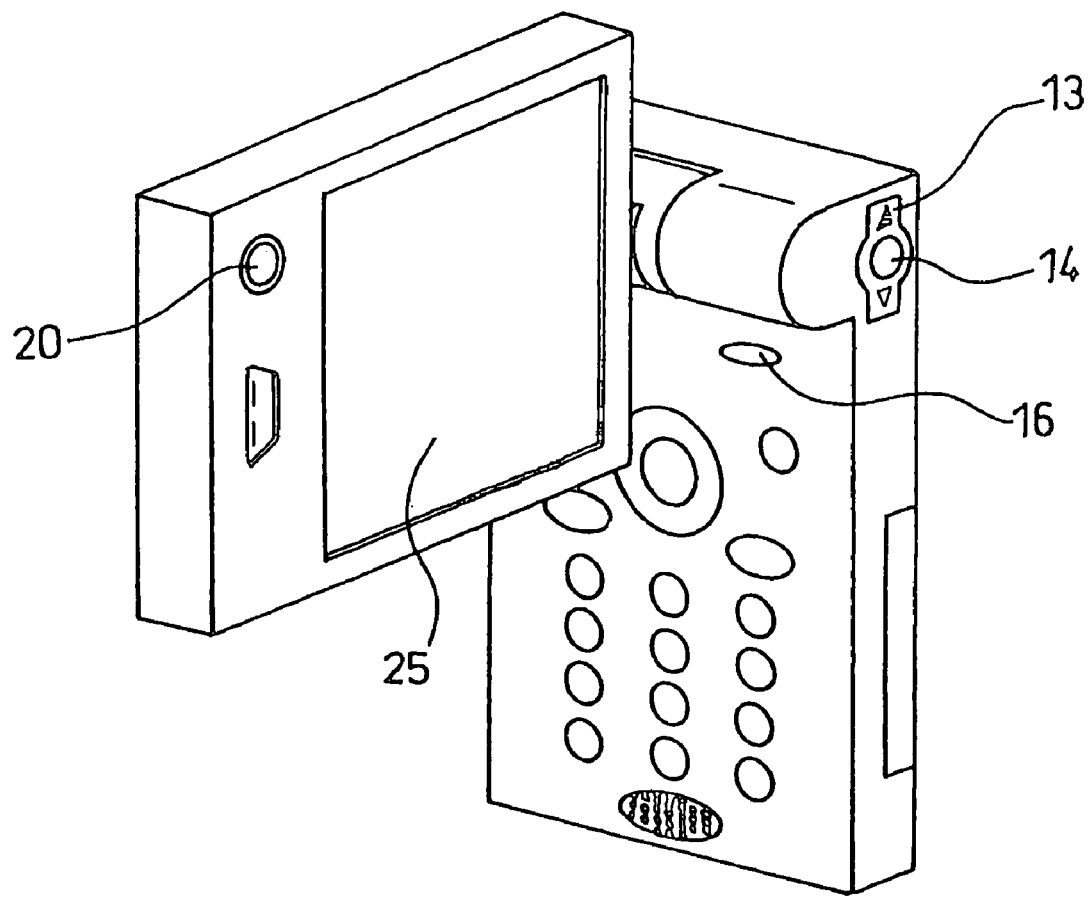
FIG. 2 is a perspective view showing the exterior constitution of the mobile terminal device according to the embodiment of the invention.

FIGS. 1 and 2 are perspective views showing the exterior constitution of a mobile terminal device according to the embodiment of the invention. FIG. 1 shows, in a mobile terminal device (mobile telephone or mobile data terminal) according to the embodiment, a state where a first housing 17 is turned about a first rotary axis 30 and unfolded.

The mobile terminal device comprises a first housing 17 having a side surface 18 and a side surface 19 (surface orthogonal to the unfolding/folding direction) adjacent to the side surface 18, and formed nearly in the shape of a rectangular parallelepiped; a second housing 10 having a side surface 11 and a side surface 12 adjacent to the side surface 10, and formed nearly in the shape of a rectangular parallelepiped; and a hinge portion 24 which couples the first housing 17 and the second housing 10 so that they can fold or unfold about the first rotary axis 30, and the first housing 17 can turn about a second rotary axis 29 orthogonal to the first rotary axis 30.

In the embodiment, the hinge portion 24 is provided for a base end portion on the second housing 10 side and coupled to the first housing 17. Herein, the first rotary axis 30 is formed in the longitudinal direction of the hinge portion 24, and the second rotary axis 29 is formed in the central portion of the first housing 17 in the direction orthogonal to the first rotary axis 30.

Further, the hinge portion 24 includes a magnet 26 for detecting an angle formed by the first housing 17 and the second housing 10 together with a sensor 23 when they turn through the first rotary axis 30; a camera 21 (second image pick-up section) located on one side surface portion in the first rotary axis 30 direction; and operational buttons (zoom button 13 and camera button 14) for operating the camera 21, located on the other side surface portion.

The first housing 17 includes a camera 20 (first image pick-up section) formed on a surface opposed to the lower housing 10 in the folding state; and a display monitor 25 which displays a picture taken by the cameras 20 or 2. Further, inside of the first housing 17, the sensor 23 for detecting a turning operation of the hinge portion 24 is provided in the vicinity of the position in which the magnet 26 of the hinge portion 24 is provided.

The lower housing 10 includes an operational key 15 and a microphone 16 for inputting voice on its surface opposed to the display monitor 25 in the folding state.

In the mobile terminal device of the embodiment, in case that a user wants to take a front picture of the side surface 19, the mobile telephone is set in the state shown in FIG. 1 and a camera mode is set. Hereby, the front picture of the side surface 19, that is, a face picture of the user can be taken by the camera 20, and the picture being taken can be confirmed in the display monitor 25.

Figure 3:
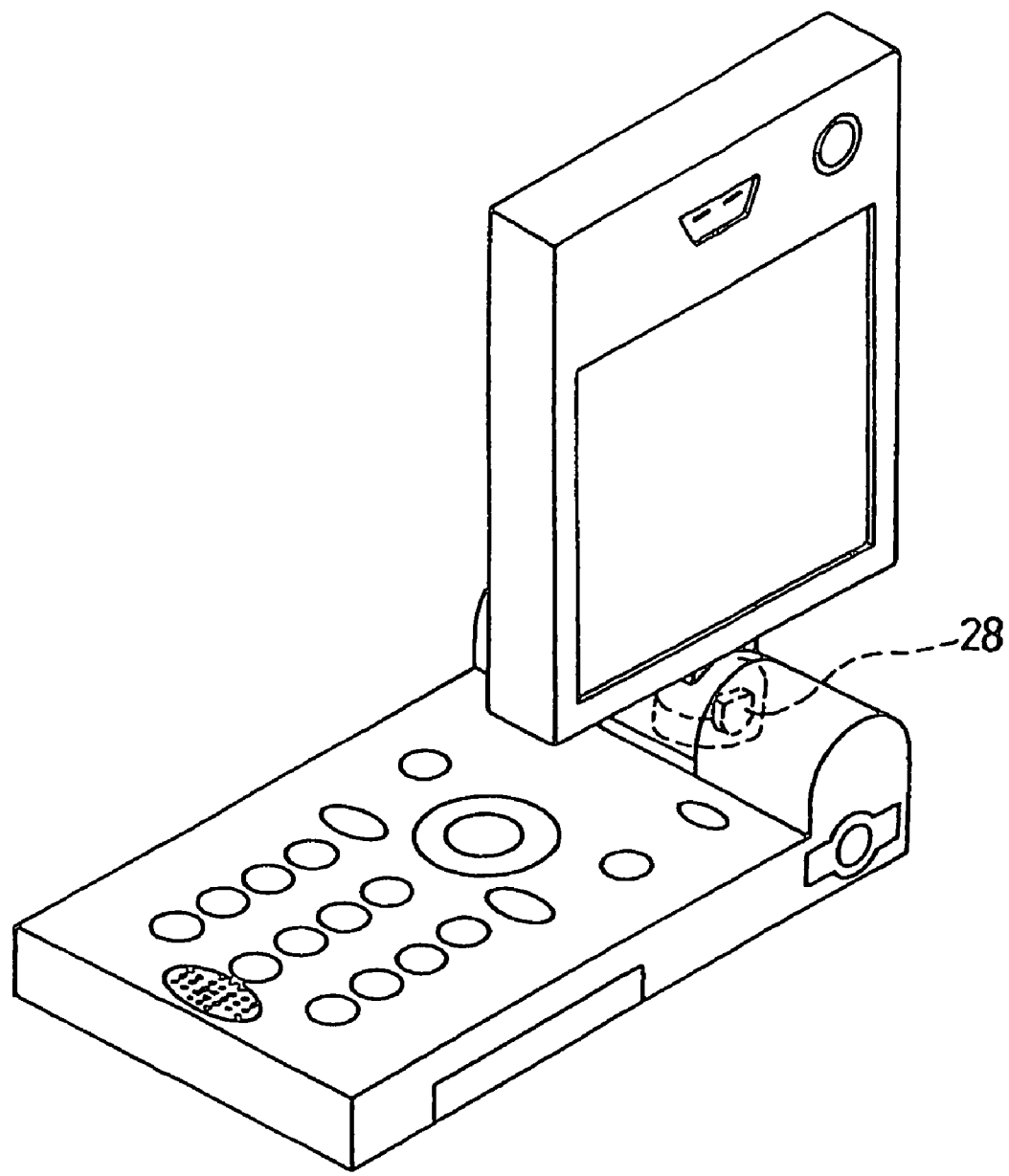
FIG. 3 is a perspective view showing the exterior constitution of the mobile terminal device according to the embodiment of the invention.

In the embodiment, as a means for detecting the turn of the hinge portion 24(an angle formed by the first housing 17 and the second housing 10), a sensor 27 comprising the sensor 23 and the magnet 26 is used. However, as shown in FIG. 3, a slide switch 28 may be provided inside the hinge portion 24 thereby to detect its turn by switching of the slide switch 28 when the first housing 17 turns.

In FIG. 2, in the mobile terminal device according to the embodiment, the first housing 17 is turned about the second rotary axis 29, so that an angle formed by the first housing 17 and the second housing 10 becomes about 90°.

By setting the mobile terminal device of the embodiment in the state shown in FIG. 2, the picture taken by the camera 21 can be displayed in the display monitor 25. Therefore, by taking a picture of scenery on the opposite side to the display monitor 25 by the camera 21, the display monitor 25 can be utilized as a finder of camera, so that the user can take a picture while he confirms the picture being taken.

Regarding a position in which the camera 21 is arranged, as long as it is on a surface exposing on the opposite side to the side surface 19 of the first housing 17 (the opposite surface to the side surface 19 or the side surface 11), of the first housing 17 surface and the second housing 10 surface in the state where the mobile terminal device is set as shown in FIG. 2, the camera 21 may be arranged in any position.

Figure 4:
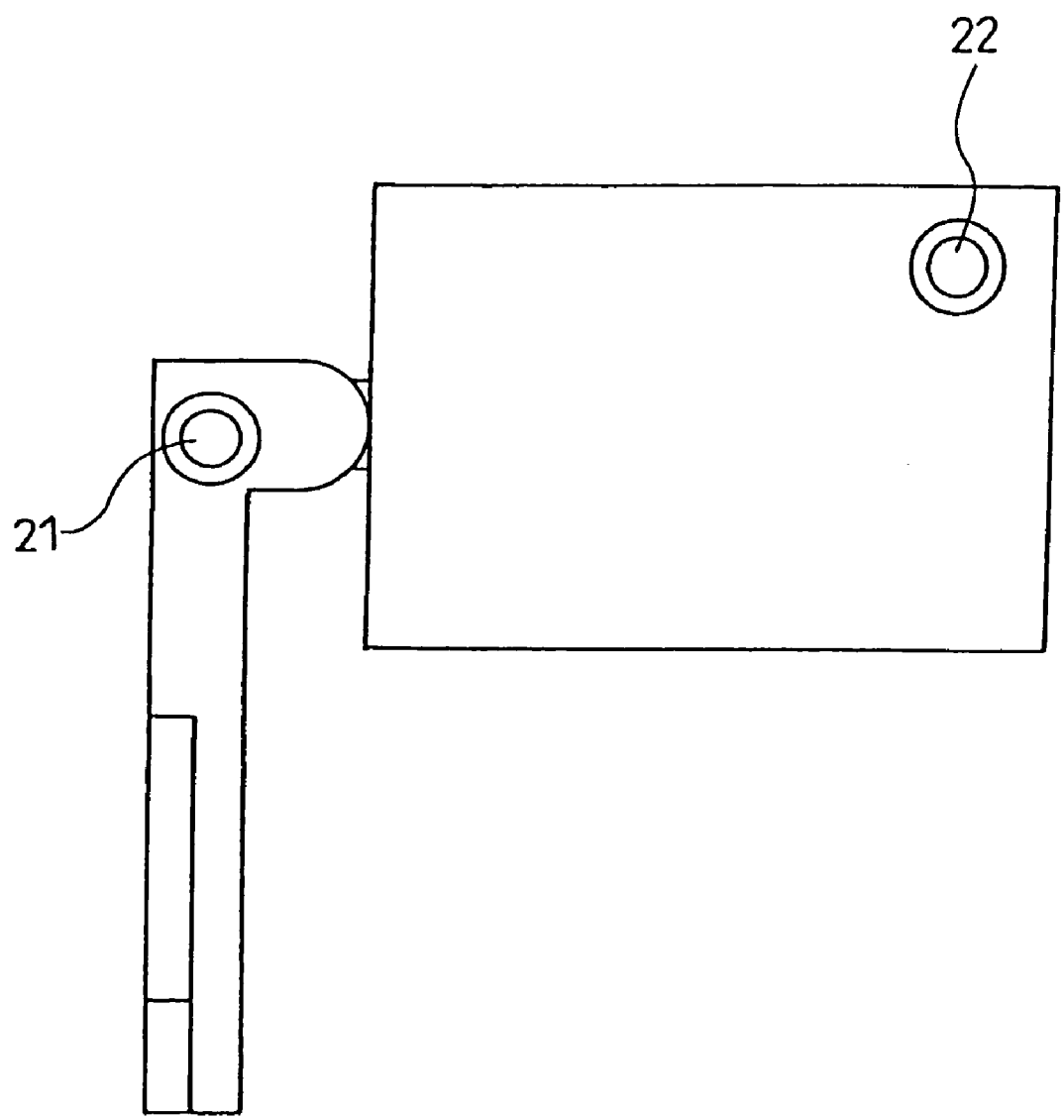
FIG. 4 is a perspective view showing the exterior constitution of the mobile terminal device according to the embodiment of the invention.

For example, as shown in FIG. 4, together with the camera 21, a camera 22 may be provided in any arbitrary position on the opposite surface to the side surface 19, or only the camera 22 may be provided in place of the camera 21. As described above, in the mobile terminal device according to the embodiment, the plural cameras are arranged so that the user can take the pictures in the opposite directions to each other.

In the thus constructed mobile terminal device, the first housing 17 and the second housing 10 are set respectively in the suitable directions, whereby the mobile terminal device operates with various functions such as a telephone function, a television telephone function, a digital camera function, and a digital video camera function. Further, in the mobile terminal device of the embodiment, the positional relation between the first housing 17 and the second housing 10 is detected by the sensor 27, whereby the operation of each camera can be switched according to its positional relation.

The operation of the mobile terminal device according to the embodiment will be described below.

Figure 5:
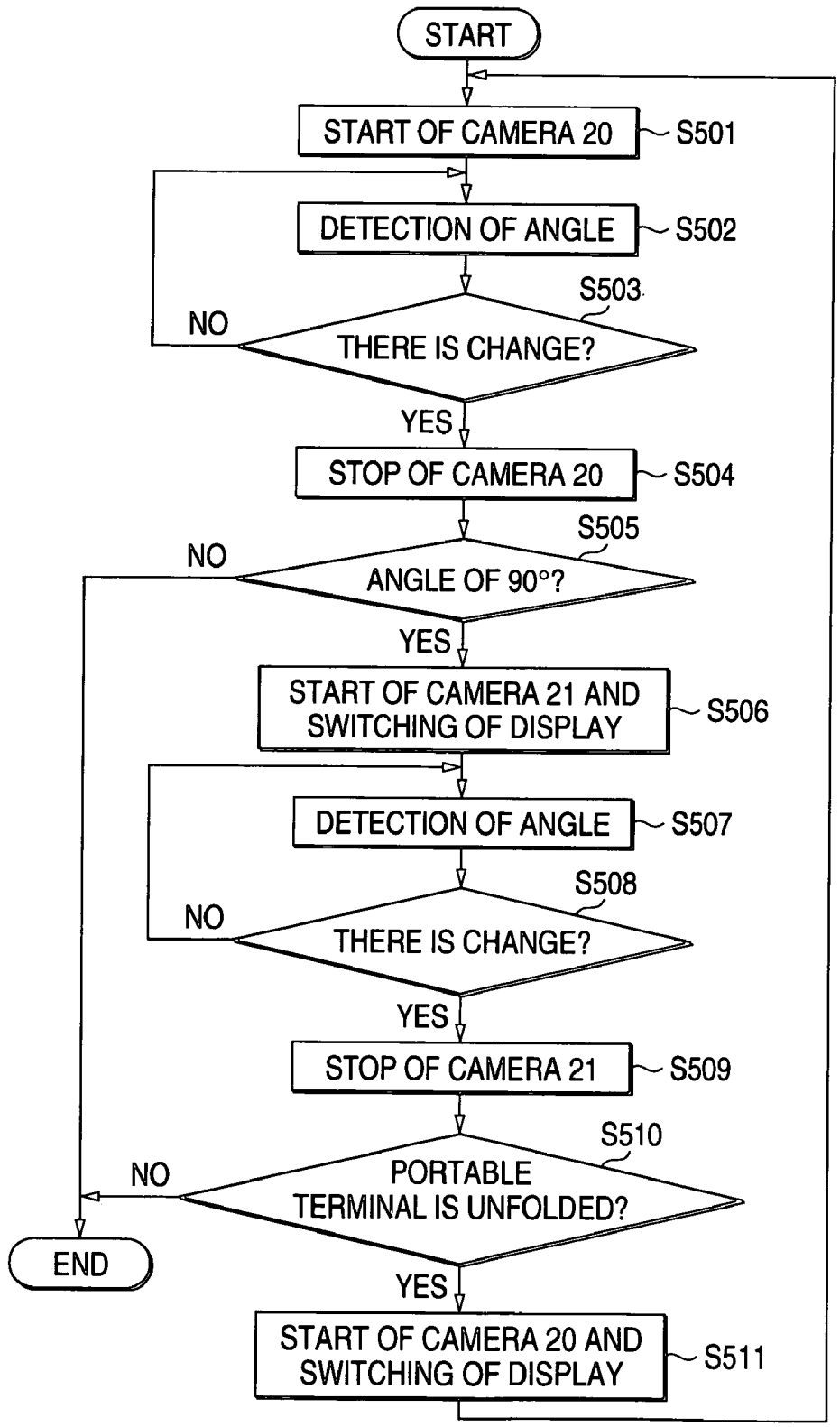
FIG. 5 is a flow chart for explaining the operation of the mobile terminal device according to the embodiment of the invention.

FIG. 5 is a flow chart for explaining the operation of the mobile terminal device according to the embodiment.

When the mobile terminal device is in the state shown in FIG. 1 by the operation of the user, and further the camera 20 starts and is operating (S501), the sensor 27 detects an angle formed by the first housing 17 and the second housing 10 (S502). In case that the first housing 17 is turned about the first rotary axis 30 by the user, and the sensor detects that the angle formed by the first housing 17 and the second housing 10 is changing in the direction where their housings are folded (S503: YES), the operation of the camera 20 stops (S504).

Further, when the first housing 17 is turned about the first rotary axis 30 and the angle formed by the first housing 17 and the second housing 10 becomes about 90° (S505: YES), the camera 21 starts and the picture being taken by the camera 21 is displayed in the display monitor 25 (S506). On the other hand, in case that the first housing 17 and the second housing 10 have been folded completely (S505: No), all the camera operations complete and the mobile terminal device returns to a usual waiting state.

In the step S506, in a state where the camera 21 starts and is operating, the angle formed by the first housing 17 and the second housing 10 is detected by the sensor 27 (S507). When the first housing 17 is turned about the second rotary axis 29 by the user thereby to become parallel to the second housing 10, and further the first housing 17 is turned about the first rotary axis 30, the change of the angle formed by the first housing 17 and the second housing 10 is detected (S508: YES), and the operation of the camera 21 stops (S509).

Further, when the sensor 27 detects that the first housing 17 and the second housing 10 turn about the first rotary axis 30 and they are folded by the angle formed by the first housing 17 and the second housing 10 (S510: No), all the camera operations complete, and the mobile terminal device returns to the usual waiting state.

On the other hand, when the sensor detects that the first housing 17 and the second housing 10 turn about the first rotary axis 30 and are unfolded (S510: YES), the camera 20 starts, and the picture taken by the camera 20 is displayed in the display monitor 25 (S511). Thereafter, the operation moves to the step S501, and the above steps are repeated.

As described above, according to the embodiment, by changing the positional relation between the first housing 17 and the second housing 10, it is possible to switch the operations of the camera 20 and the camera 21. For example, when the user uses the mobile terminal device in the state shown in FIG. 1 to take a picture of his face, in case that he suddenly wants to take a picture of scenery on the opposite side to the side on which his face exists, he only changes the state of the mobile terminal device to the state shown in FIG. 2. Then, the camera 21 starts, and he can start taking a picture of scenery on the opposite side to the side surface 19 by a simple operation.

On the other hand, to the contrary, even when he is taking a picture of the opposite surface to the side surface 19, he can start taking the front picture of the side surface 19 by only changing the state of the mobile terminal device to the state shown in FIG. 1.

In the state where the camera 20 or the camera 21 is operating, when the operation of folding the mobile terminal device is performed (the first housing 17 and the second housing 10 are turned about the first rotary axis 30 so as to come into contact with each other, the operation of the camera 20 or the camera 21 stops automatically. Therefore, it is not necessary to stop the camera operation by the key operation, so that the camera operation can be stopped simply.

As described above, the mobile terminal device according to the embodiment can switch the operation control of each camera on structure or stop its operation. Therefore, power consumption caused by the key operation can be eliminated. Further, since the key operation is not required, operation ability can improve and picture taking can be quickly performed.

According to the invention, it is possible to provide a mobile terminal device provided with plural image pick-up sections, wherein an operation of each image pick-up section can be controlled by a simple operation.

What is claimed is:

1. A mobile terminal device comprising:
   an hinge portion;
   a second housing formed nearly in the shape of a rectangular parallelepiped;
   a first housing formed nearly in the shape of a rectangular parallelepiped and coupled to said second housing by said hinge portion foldably and so that said first housing is capable of turning in relation to the second housing in the direction orthogonal to the foldable direction;
   a first image pick-up section provided for a surface opposed to said second housing in a state that the device is folded;
   a second image pick-up section provided, in a state where said first and second housings are unfolded at an angle of about 90° and further the first housing turns at an angle of about 90° to the second housing, for a surface on the opposite side to the surface having said first image pick-up section, of said first and second housings; and
   a position detecting section for detecting a positional relation between said first and second housings according to a change of the angle between said first and second housings;
   wherein, in a state when said position detecting section detects that said first and second housing are initially unfolded at an angle of at least about 90°, an operation of said first image pick-up section is automatically started,
   wherein, in a state where said first and second housings are unfolded and said first image pick-up section is operating, when said position detecting section detects that said first and second housings are changing in a direction to be folded to each other, an operation of said first image pick-up section is stopped.

2. The mobile terminal device according to claim 1, wherein, in a state where said first and second housings are unfolded and said first image pick-up section is operating, when said position detecting section detects that the first housing is turned at angle of at least about 90° to said second housing, the operation of said first image pick-up section is stopped and an operation of said second image pick-up section is started.

3. The mobile terminal device according to claim 2, wherein, in a state where said first and second housings are unfolded at the angle about 90°, the first housing is turned at an angle of about 90° to said second housing, and said second image pick-up section is operating, when said position detecting section detects that said first and second housings are changing in one of a direction to be unfolded and a direction to be folded, an operation of said second image pick-up section is stopped.

4. The mobile terminal device according to claim 2, wherein, in a state where said first and second housings are unfolded at an angle of about 90°, said first housing is turned at an angle of about 90° to the second housing, and said second image pick-up section is operating, when said position detecting section detects that said first and second housings are changing in a direction to be unfolded, an operation of said second image pick-up section is stopped and the operation of said first image pick-up section is started.

* * * * *